United States Patent
Haas Jun

[19]

[11] Patent Number: 6,082,250
[45] Date of Patent: Jul. 4, 2000

[54] DEVICE FOR TREATING STARCH-BASED PRODUCTS

[75] Inventor: Franz Haas Jun, Vienna, Austria

[73] Assignee: Franz Haas Waffelmaschinen-Industrie Aktiengesellschaft, Vienna, Austria

[21] Appl. No.: 09/284,317

[22] PCT Filed: Nov. 6, 1997

[86] PCT No.: PCT/AT97/00241

§ 371 Date: Apr. 26, 1999

§ 102(e) Date: Apr. 26, 1999

[87] PCT Pub. No.: WO98/19547

PCT Pub. Date: May 14, 1998

[30] Foreign Application Priority Data

Nov. 6, 1996 [AT] Austria .................................... 1931/96

[51] Int. Cl.⁷ .............................. A23L 1/00; A21C 13/00; A21C 15/00; F25D 13/04; F25D 13/06
[52] U.S. Cl. ......................... 99/470; 99/443 C; 99/450.4; 99/476; 99/477; 99/485; 99/517; 432/141; 432/230
[58] Field of Search .............................. 99/353–355, 339, 99/340, 443 R, 443 C, 450.1–450.7, 494, 470, 516, 485, 517, 534, 473–479; 62/187, 427; 198/706, 802, 803.14; 426/391, 393, 496, 523, 524; 432/230, 141, 31, 37; 219/388; 34/132, 209

[56] References Cited

U.S. PATENT DOCUMENTS

| 3,670,132 | 6/1972 | Kaufman, Jr. et al. |
|---|---|---|
| 3,804,583 | 4/1974 | Parkes . |
| 5,795,607 | 8/1998 | Haas et al. ................................ 99/354 |
| 5,955,129 | 9/1999 | Haas, Sr. et al. ........................ 99/353 |

FOREIGN PATENT DOCUMENTS

| 0 111 593 A1 | 6/1984 | European Pat. Off. . |
|---|---|---|
| 0 131 448 A2 | 1/1985 | European Pat. Off. . |
| 2 424 705 | 11/1979 | France . |
| 33 45 473 A1 | 6/1984 | Germany . |
| 40 40 429 A1 | 7/1991 | Germany . |
| 43 20 482 A1 | 1/1995 | Germany . |
| 2 156 501 | 10/1985 | United Kingdom . |
| 2 177 586 | 1/1987 | United Kingdom . |

*Primary Examiner*—Timothy Simone
*Attorney, Agent, or Firm*—Herbert Dubno

[57] ABSTRACT

A device for treating massage based products such as wafer materials for consumption or for packaging to cool and moisturize the same. The device has a channel through which the product can be moved in which the product path is flanked by a pair of air channels which have openings opposite one another so that the air can pass from one air channel to the other transversely to the direction of displacement of the products in the product channel. The walls between the air channels and the product channels are bearing walls and preferably massive plates having the aforementioned openings. The lining or housing can have removable walls or doors which open to offer access to the air channels and the product channel for cleaning purposes.

13 Claims, 7 Drawing Sheets

6,082,250

DEVICE FOR TREATING STARCH-BASED PRODUCTS

CROSS REFERENCE TO RELATED APPLICATIONS

This is a National Stage of PCT/AT 97/00241 filed Nov. 6, 1997 and based, in turn, upon Austrian National Application A 1931/96 of Nov. 6, 1996 under the International Convention.

1. Technical Field

The invention relates to a device for treating starch-based products, such as edible wafer products or biodegradable packaging material, with air for setting a certain humidity content or for cooling the products. This device comprises a machine frame having an outer lining, containing at least one transport device which transports the products through a transport channel outwardly bordered by the outer lining, from a charging station in one or several product tracks through one or more zones to a discharge station. Each zone contains at least two air ducts running at least partially parallel to a product track, each having a duct wall provided with air passage openings facing the product track. In each zone air flows from an air duct transversely with respect to the transport direction of the products, through the product track and into the other air duct.

2. State of the Art

The treatment of starch-based products with air for setting a certain humidity content of the products makes it possible to target the product characteristics for a certain purpose or a certain variant for further processing of the treated products. The treatment air which is used can be heated and humidified inside or outside of the treatment, or heated, humidified and filtered. The treatment is mainly applied to starch-based products. These are for instance thin-walled shaped bodies produced of grain flours and/or starch-containing masses. These shaped bodies can be produced by injection molding or extrusion, or by baking between two mold halves. Examples of such products are edible wafers, such as deep bowls, flat plates, flat shells, trays, flat sheets, etc. such as are known from the baked-goods, wafer-baking and sweets-producing industry. Other examples of such products are biodegradable packaging materials, such as deep cups, flat plates, flat shells, shallow cups, fast-food packaging, trays, flat sheets, etc.

The treatment of starch-based products with air, for cooling of the products makes it possible to transform products composed of thin-walled shaped bodies and of spreading masses made spreadable through heating into rigid blocks by the hardening of the spread, which subsequently can be handled or, further processed as massive blocks. Examples of such products are cream-filled wafer blocks, which are used as intermediate products in the baked-goods, wafer-baking and sweets-producing industry for the particular production line and for further processing.

In the production of biodegradable packaging products made of masses containing grain flours and/or starch. it is known to use air treatment for setting a humidity content of the thin-walled shaped bodies of 6% by weight up to 22% by weight, in order to obtain products which are tough, strong and have a high mechanical stability.

In the sweets-producing industry continuously operating production lines for the production of small cream-filled and chocolate-covered wafers are known. In these production lines, in automatic baking machines large, flat, rectangular wafer sheets are produced, which are baked in the baking molds of the continuously revolving baking tongs of the wafer-baking machines from a flowable wafer dough consisting mainly of water and flour. These wafer sheets leave the respective baking machine in a crunchy, brittle and easily breakable state with a humidity content of 1% by weight to 2% by weight. These wafer sheets represent an intermediate products of the production line, whose humidity content is increased in a controlled manner to 4% by weight up to 6% by weight in a device for treating the wafer sheets with air, which is integrated in the production line. This increased humidity content should prevent the detachment of the chocolate coating in chocolate-coated wafers during a long storage period.

A known device for treating wafer sheets with air has a conditioning channel, which has two superimposed treatment zones with two horizontally positioned product tracks and an endless transport device, which transports the wafers arranged in transport compartments through a horizontal transport channel and both treatment zones. Another known device for treating wafer sheets with air is a conditioning tower, which has two adjacent treatment zones with two vertical product tracks and an endless transport device which transports the wafer sheets lying in transport compartments through a vertical transport channel and both treatment zones.

In the product line, the wafer sheets with increased humidity content are coated on their upper surface with a cream, which was rendered spreadable by heating, and are subsequently layered on each other in groups, to form cream-filled wafer blocks. Depending on the production line, wafer blocks covered with cream on their upper side or wafer blocks covered on their upper side by an uncoated wafer sheet are formed. These wafer blocks are cooled in a device for the treatment of wafer blocks with air, in order to harden the spreadable cream and to transform the wafer blocks in compact, rigid blocks.

A known device for the treatment of wafer blocks covered with cream on their upper side has a cooling channel, wherein the wafer blocks lying in a horizontal production track facing upwards with their coated upper side are transported through one or several cooling zones. Another known device for the treatment of wafer blocks covered on the upper side with an uncoated wafer sheet is a wafer cooling press, wherein an endless transport device transports the wafer blocks in a closed circuit track through a space surrounded by the outer lining, where in a cooling zone cooled air is circulated.

The cooled and solidified wafer blocks are separated in the respective production line into many small cube-shaped wafer pieces, which during their further transport are at first separated and then individually coated with chocolate. The small cream-filled and chocolate-covered wafer represent the final product of the respective production line, which is packaged at the end of the production line.

In the known devices used for setting a certain humidity content of the products or for cooling the products, the machine frame is mostly a rectangular box frame, consisting of horizontal and vertical square pipes and are provided with an outer heat-insulating lining. The transport channel for the products and the air channels of the zones traversed by humid or cooled air are all arranged inside the box frame. The air channels running parallel to the product track have a channel wall provided with air passage openings facing the product track. The air channels consist each of several channel segments separated by expansion joints forming a self-supporting component, which is fastened to a crossbeam projecting inwards from the box frame. Each air channel is mounted at a distance from the inside of the box frame, so that between the former and the box frame sufficient space is left for a free movement, which is necessary for the swinging devices of the doors of the outer lining.

In the known devices used for setting a certain humidity content of the products or for cooling the products, the cleaning and disinfecting is extremely complicated and time-consuming and therefore can be performed only during long periods of standstill of the entire production line. The effort spent for the cleaning, disinfection and for insuring that the known devices are free of germs is substantial since not only the air channels with their numerous expansion joints and air passage openings, but also inside of the outer lining and all the components and surface arranged therein, within the inner space of the device, have to be cleaned, disinfected and kept free from germs. This requirements extends also to the plate elements and doors of the outer lining over the box frame with its horizontal and vertical square pipes and the crossbeams supporting the air channels, including the numerous corners and gaps formed by the beams, up to the outside and inside of the channel walls of the individual air channels.

In the known device, before the cleaning and disinfecting of the outside and inside of the channel walls of the individual air channels can be started, it is necessary to first remove the plate elements and doors of the outer lining from the box frame, respectively to swing the doors of the outer lining completely aside only then can the air channels inside the box frame be detached from their crossbeams and taken apart in their separate channel segments. These have then to be taken out from the inner space of the device, through the horizontal and vertical members of the box frame consisting of square pipes, before they can be fully taken apart. Only then do the outer sides and inner sides of all smooth wall segments provided with air passage openings, including all expansion joints arranged therebetween, become freely accessible.

A known device for setting a certain humidity level of products contains air channels wherein the channel walls are formed by an elongated trough and a lid which covers the open side of the trough and is airtight connected with the same. Lid and trough define an elongated air channel with a rectangular cross section which has to be taken out from the box frame as a unit and again built into the box frame as a unit.

After all separate parts of the air channels have been cleaned and disinfected, their channel segments have to be assembled outside the box frame and introduced into the same. Inside the box frame the channel segments are again put together to form a separate air channels which are fastened to the cross beams of the box frame. With these very extensive and time-consuming operations only the air channels are cleaned and disinfected at their outside and inside, but not the box frame itself with its horizontal and vertical square pipes and its cross beams supporting the air channels, or the rest of components built into the box frame, nor the inside of the plate elements and doors of the outer lining.

OBJECT OF THE INVENTION

It is the object of the invention to provide a device for the treatment of starch-based products, such as edible wafer products or biodegradable packaging products with air, for setting a certain humidity content of the products or for cooling the products, whose construction simplifies cleaning and disinfection and which reduces the overall dimensions of the device.

SUMMARY OF THE INVENTION

The invention is a device for treating starch-based products, such as edible wafer products or biodegradable packaging products with air for setting a certain humidity content of the products or for cooling the products. This device has a machine frame with an outer lining, which contains at least one transport device which transports the products at least in one transport channel bordered on the outside by the external lining, from a charging station in one or more product tracks, through one or more zones, to a discharge station. Each zone comprises at least two air channels at least partially parallel to a product track, each having a channel wall facing the product track provided with air passage openings. In each zone air flows from an air channel transversely to the transport direction of the products through the product track into the other air channel. According to the invention this device is characterized in that each zone contains at least two air channels, which are bordered towards the outside by the outer lining and towards the inside by the channel wall provided with air passage openings, which are formed by a bearing wall of the machine frame. At least two of this bearing walls of the machine frame define between them at least one transport channel containing at least one product track.

Due to the construction of the invention, the entire device is divided into individual transport or air channels, each bordered on the outside by the external lining, which are separated from each other by channel walls in which the supporting machine frame is integrated. The invention allows for a considerably simplified construction, combined with a reduction of the number of components and of the space requirements at the installation site. At the same time the air channels can be widened by the space which heretofore was occupied by the box frame and the interstices between the box frame and the air channels. Larger flow cross sections for the air channels can be provided, which with the identical air throughflow leads to slower air velocity and reduced noise in the air channels, as well as to a reduction of the particles entrained by the air in the air channels.

When the outer lining is opened, in the device of the invention the transport, or air channels are open towards the outside and are easily accessible for cleaning and disinfecting, which drastically reduces the cleaning and disinfecting effort. Due to the integration of the machine frame in the easily accessible channel walls, in the device of the invention the number and size of the surfaces to be cleaned and disinfected are considerably reduced compared to the known devices. This is the contribution made by the elimination of the numerous square pipes of a box frame surrounding the air channels and the transport channel on the outside, with their numerous intersections and undercuts, as well as by the reduction of components of the device.

The construction of the invention is also advantageous in devices for treating starch-based products with air, when due to the substantial construction length or height the device has to be composed of several device segments butting each other via expansion joints. The unavoidable expansion joints, each requiring a thorough cleaning and disinfection, are easily accessible in the outwardly open transport or air channels, due to the division of the device according to the invention.

According to a further feature of the invention, each bearing wall of the machine frame, which with one wall area forms a channel wall equipped with air passage openings of an air channel, is designed as a smooth wall at least in the portion of this wall facing the air channel. This design reduces those locations of the respective air channel wherein particles or bacteria entrained by the treatment air and distributed throughout the channel can collect.

According to a further feature of the invention each bearing wall of the machine frame, which forms with one wall area a channel wall of the air channel equipped with air passage openings, is designed as a smooth wall on the side of this wall area facing the air channel and on the side of this wall area facing away from the air channel. Due to this design, in the channel wall with air passage openings located between an air channel and a transport channel, on the side facing the air channel, as well as on the side facing the transport channel, it is possible to reduce the locations where particles and bacteria, entrained with the treatment air and distributed throughout the air channel or transport channel, can collect.

According to a further feature of the invention, between two bearing walls of the machine frame, a long-stretched, horizontal transport channel containing one or more product tracks is arranged and together with the channel walls equipped with the air passage openings forms two or more air channels.

Due to this construction an elongated device for treating starch-based products is subdivided into separate, substantially transport or air channels, each outwardly bordered by the external lining, the bearing machine frame being integrated therein. Such an elongated device can be used for treating of wafer sheets or other flat, thin-walled shaped bodies (e.g. flat cups or flat trays for packaging purposes) with humid air, whereby the products standing in the transport channel are transported through a single treatment zone, or through two or more successive treatment zones. Such an elongated device can be used for cooling of wafer blocks coated on the upper side with a cream layer, which in the transport channel lie with their uncoated bottom side on a conveyor belt and are transported through a single treatment zone, or through two or more successive treatment zones.

According to a further feature of the invention, provided that in the horizontal transport channel, product tracks arranged one above the other, a horizontal dividing wall is arranged rigidly connecting the two machine frame bearing walls which form the channel walls equipped with air passage openings of one or more air channels. Due to this construction an additional rigidity of the bearing machine frame is achieved. By means of the horizontal dividing wall the horizontal transport channel is divided into two or more transport channels, each extending along a product track.

According to a further feature of the invention, the transport channel contains product tracks arranged one above the other, each having its own transport device. This construction makes it possible to modify the amount of simultaneously treated products by including or excluding a transport device or a product track.

According to a further feature of the invention the transport channel has at least one endless transport device, extending between two product tracks arranged above one another.

According to a further feature of the invention, an enlongated substantially vertical transport channel containing one or more product tracks is arranged between two machine frame bearing walls, which form the channel walls equipped with air passage openings of two or more air channels. Due to this design, a device for treating starch-based products shaped like vertical tower is subdivided into separate vertical transport or air channels, each bordered on the outside by the external lining, which are separated from each other by channel walls integrating the bearing machine frame. Such a device can be used for treating wafer sheets or other flat shaped bodies with humid air, whereby the products lying in transport compartments are transported in the vertical transport channel through the vertical product tracks and through the thereto assigned treatment zones. Such a device can also be used for cooling of wafer blocks which lying in transport compartments, are transported in the vertical transport channel through the vertical product tracks and the thereto assigned cooling zones.

According to another feature of the invention, between two neighboring product tracks, a dividing wall rigidly connects the two machine frame bearing walls forming the channel wall equipped with air passage openings of two or more air channel. Due to this construction, an additional rigidity of the bearing machine frame is achieved in a tower-shaped device of the invention. By means of the vertical dividing wall the vertical transport channel of the tower is divided in two transport channels, each bordered on the outside by the external lining, each extending along one of the two vertical product tracks.

According to a further feature of the invention in a vertical transport channel at least one endless transport device for the products is arranged, which extends through two neighboring product tracks and has transport compartments open towards the outer lining, which on their inside are bordered by at least one endless belt of the transport device. This construction makes it possible to influence in a controlled manner the relative movements between the transport compartment and the therein contained products which occur in the upper end segment of the vertical transport channel at the transfer from one product track to the other. The endless belt of the transport device constitutes an internal mobile border of the transport compartments, which becomes effective in the in the upper segment of the transport channel, when the product in its transport compartment comes into contact with the belt due to gravity and is transferred in its transport compartment from the trailing compartment border to the advancing compartment border.

According to a further feature of the invention the machine frame bearing wall forming a channel wall equipped with air passage openings of an air channel is a massive plate.

According to a further feature of the invention, the machine frame bearing wall forming a channel wall equipped with air passages of an air channel is a massive aluminum plate.

According to a further feature of the invention the outer lining can have swingably supported doors on the machine frame, at least in the areas where it outwardly borders the air channel, which when closed outwardly border the respective air channel with their smooth inner sides.

DESCRIPTION OF THE DRAWING

The above and other objects, features, and advantages will become more readily apparent from the following description, reference being made to the accompanying drawing in which.

SPECIFIC DESCRIPTION

Figure 1:
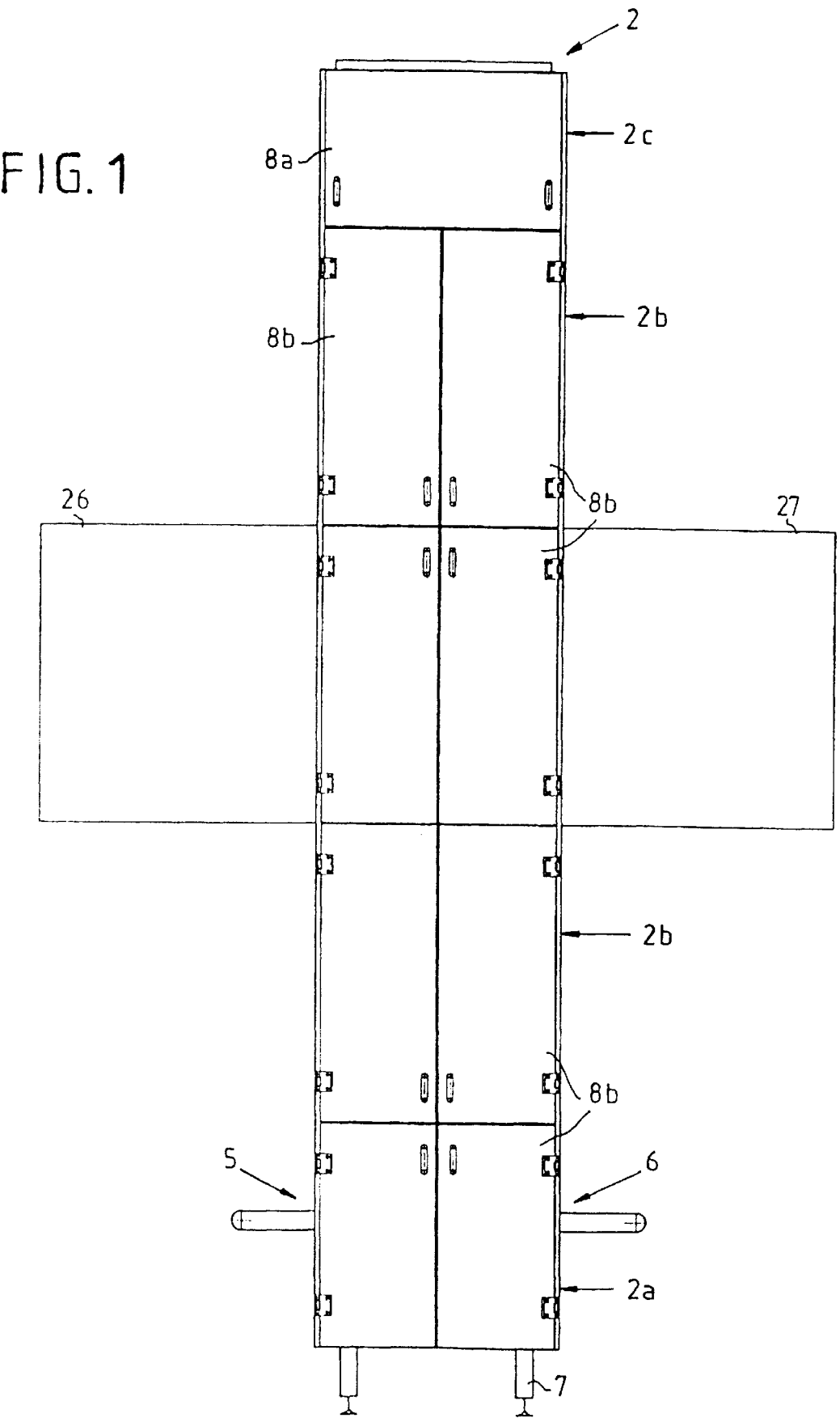
FIG. 1 is a front view of a device for treating starch-based products with air, built like a tower.
Figure 2:
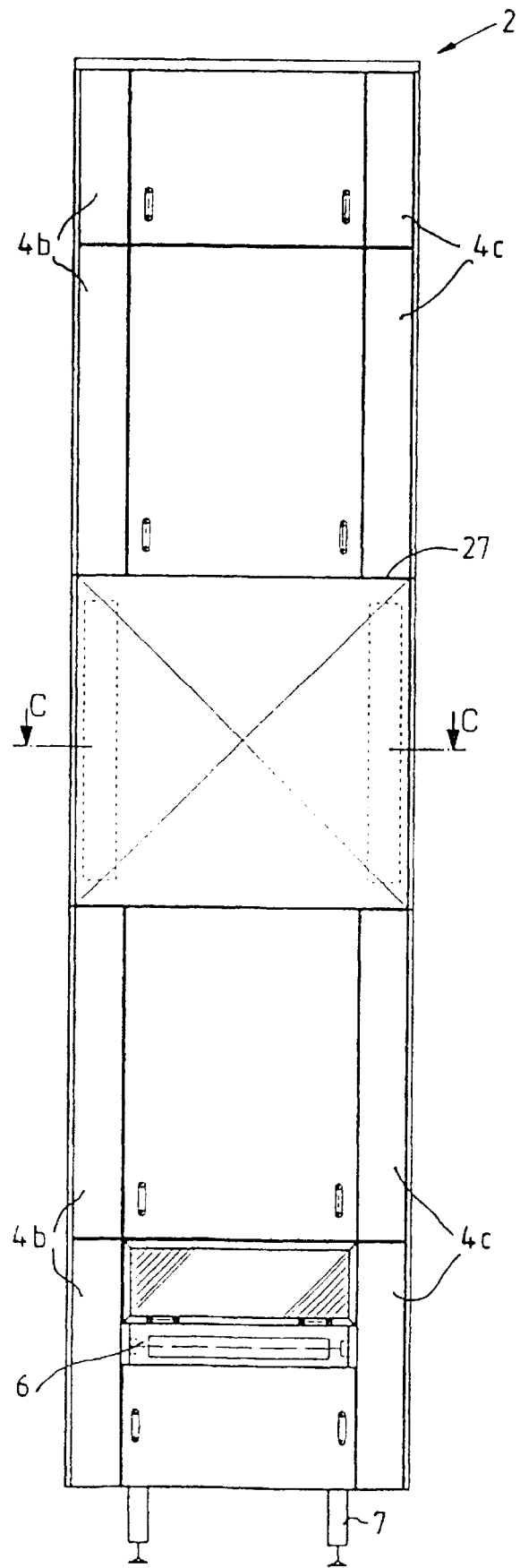
FIG. 2 is a lateral view of the device in FIG. 1.
Figure 3:
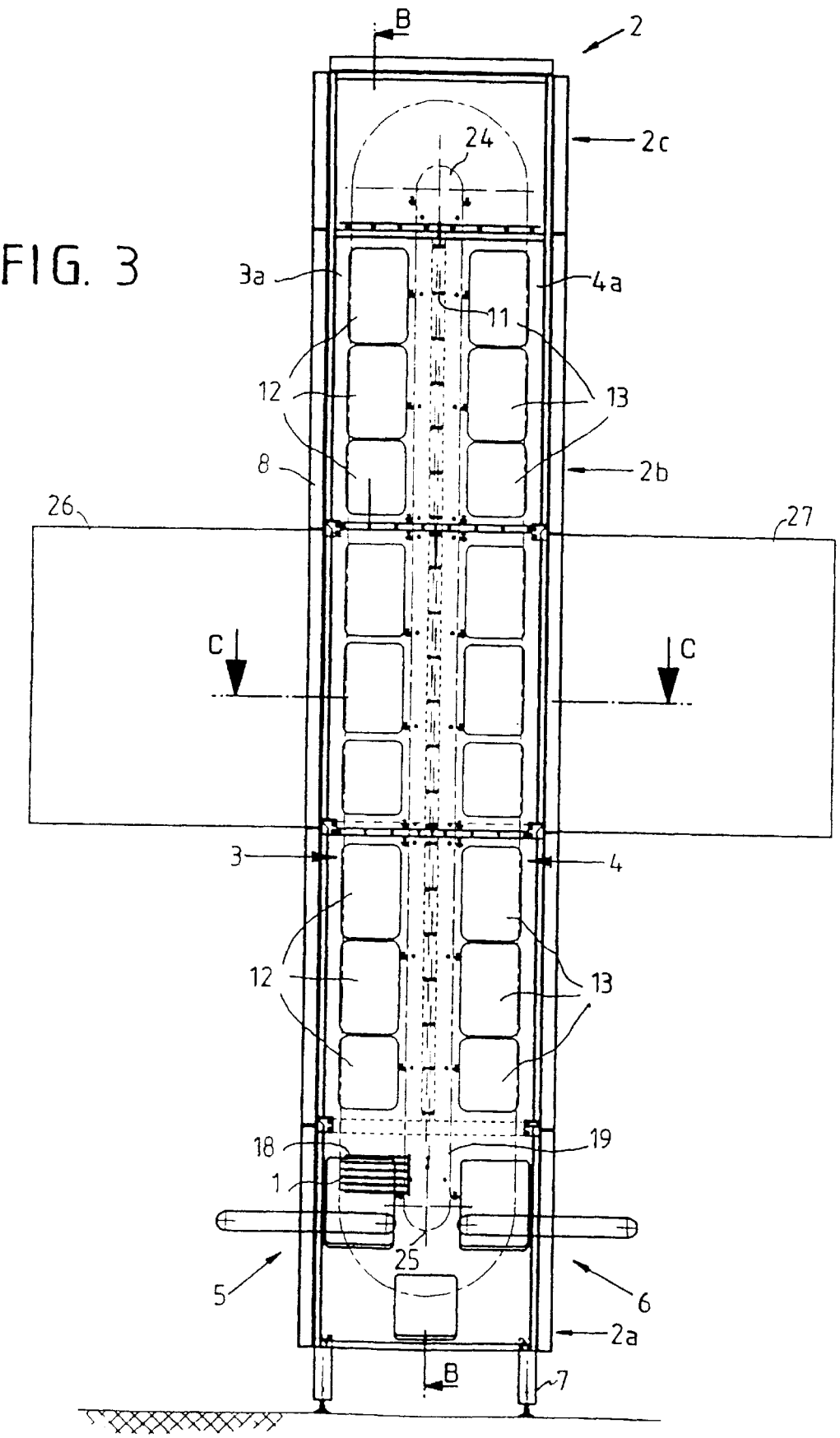
FIG. 3 is a schematic vertical cross section, parallel to the flat front side of the tower, through the device of FIG. 1 and along the line A—A in FIG. 5.
Figure 4:
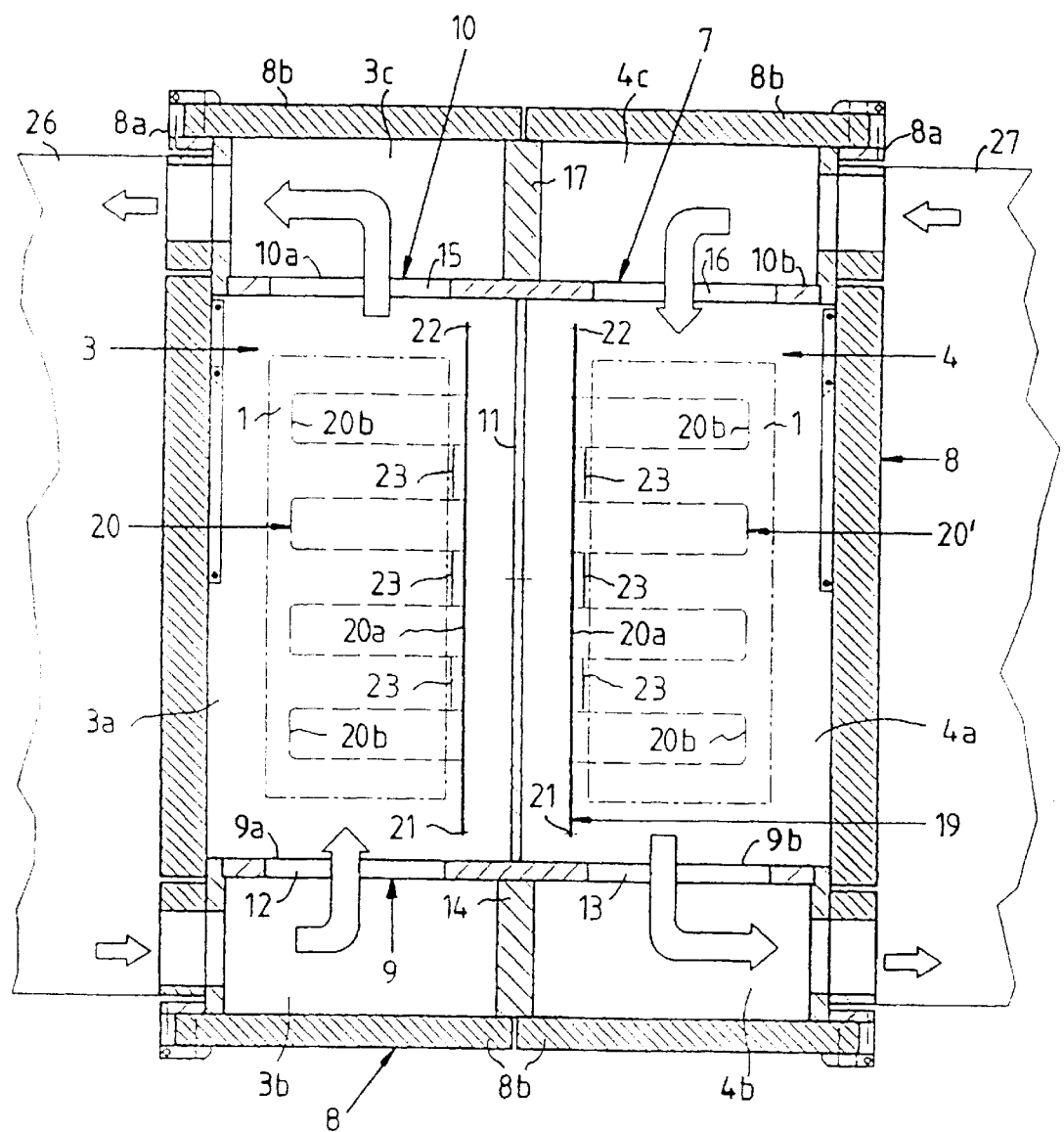
FIG. 4 is a schematic horizontal cross section through the device of FIG. 1 along the line C—C in FIG. 2 or FIG. 3.
Figure 5:
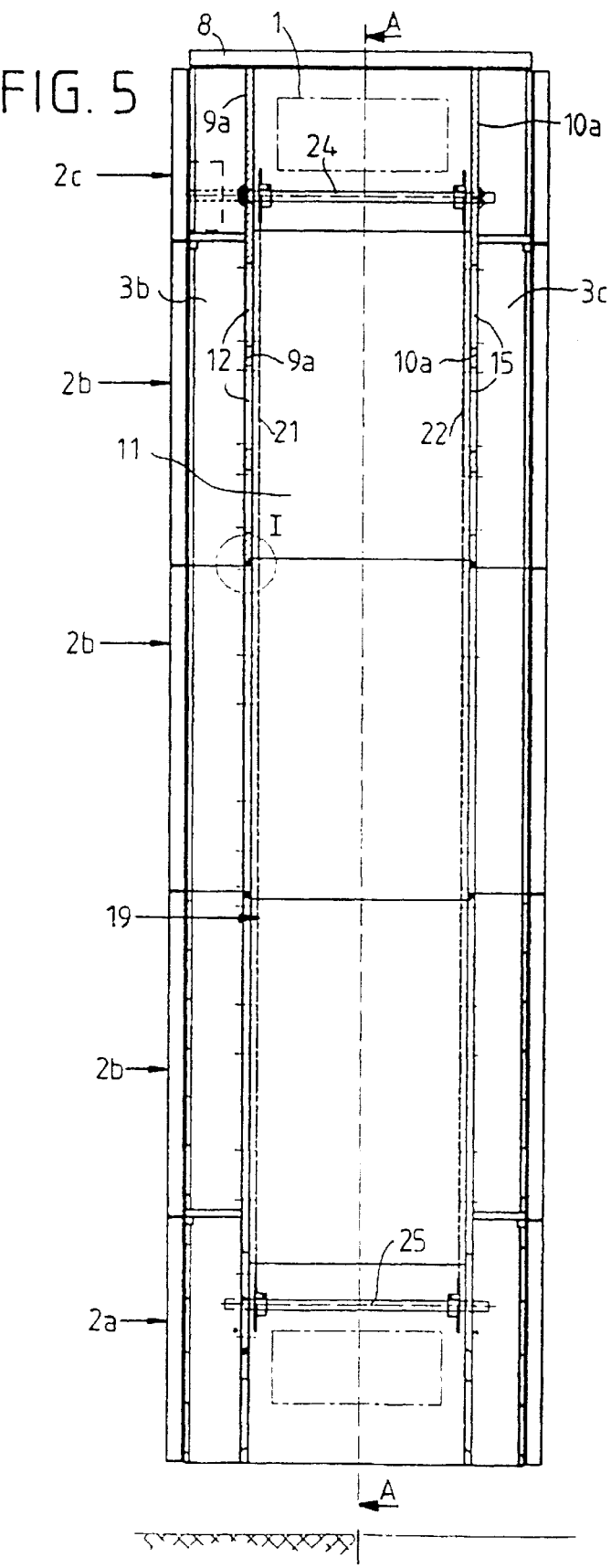
FIG. 5 is a vertical cross section parallel to the frontal tower side through the device of FIG. 1 along the line B—B in FIG. 3.
Figure 6:
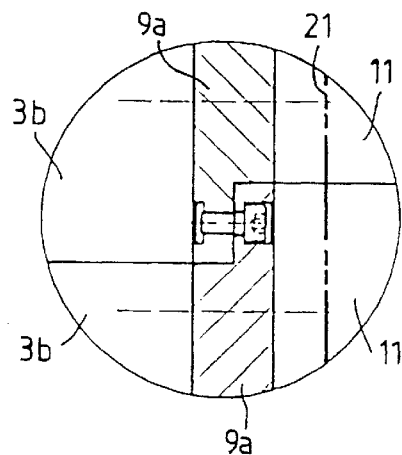
FIG. 6 is a detail of FIG. 5 in section.

FIGS. 1 to 6 describe an embodiment of a device for treating starch-based products with air, which is built like a vertical tower wherein even, flat products are transported lying down through two zones where they are treated with air. The even, flat products can be rectangular wafer sheets or square wafer blocks or other starch-based thin-walled shaped bodies, such as packaging trays or the like.

The products 1 to be treated are fed to the tower 2 from its left side, i.e. in FIGS. 1–4 from the left. The treated products 1 are discharged from the tower 2 on its right side, i.e. in FIGS. 1–4 to the right. In the rectangular tower 2, in the left half a first zone 3 and in the right half a second zone 4 are located. In the left tower half a first vertical product track 3a for the products 1 is located, between a front and a rear vertical air channel, respectively 3b and 3c of the first zone 3. In the right tower half a second vertical product track 4a for the products 1 is arranged between a front and a rear air channel, respectively 4b and 4c of the second zone 4.

Over its height the tower 2 is arranged in several segments and consists of one end segment 2a resting on the ground, several identical middle tower segments 2b and an upper end segment 2c. In the lower end segment 2a the charging station 5 assigned to the left tower half and the discharge station 6 assigned to the right tower half are located. The first product track 3a of the first zone 3 and the two air channels 3b and 3c associated therewith extend respectively in the travel direction of products 1 from the charging station 5 through all middle tower segments 2b vertically upwards to the upper end segment of the tower 2. The second product track 4a of the second zone 4 and two air channels 4b and 4c associated therewith extend in the travel direction of the products 1 from the upper end segment of the tower 2 through all middle segments 2b vertically downwards to the discharge station 6.

The tower 2 has a bearing machine frame 7 extending vertically through all tower segments and which has an outer heat insulating lining 8 consisting of heat-insulating plates 8a and heat-insulating doors 8b each extending over the height of one tower segment 2a, 2b, 2c. The plates 8b are detachably fastened to the machine frame 7 and the doors 8b are swingably connected with the machine frame 7 or with the plates 8a fastened to the machine frame 7.

A front vertical bearing wall 9 of the machine frame 7 extends through both halves of the tower 2 and separates the two product tracks 3a, 4a from the frontal air channels 3b, 4b of the two zones 3, 4. A rear vertical bearing wall 10 of the machine frame 7 also extends through both halves of the tower 2 and separates the two product tracks 3a, 4a from the rear air channels 3c, 4c of the two zones 3, 4. The two walls 9, 10 of the machine frame 7 are parallel to each other and rigidly connected to each other by a vertical dividing wall 11 of the machine frame 7, which is arranged between the two product tracks 3a, 4a.

Between the front and the rear wall 9, 10 of the machine frame 7 there is a vertical transport channel which is bordered on its left, respectively right outer side by the plates 8a, respectively by the doors 8b of the outer lining 8. This transport channel is divided by the dividing wall 11 into a left vertical transport channel, bordered on the inside by the dividing wall 11 and open to the outside towards the external lining 8, wherein the first product track 3a is received, and into a right vertical transport channel bordered on the inside by the dividing wall 11 and open to the outside towards the external lining 8, wherein the second product track 4a is received.

The front wall 9 of the machine frame has a first wall area 9a which projects into the left half of the tower 2 and is provided with air passage openings 12. This wall area 9a constitutes the frontal border wall of the left transport channel and at the same time a channel wall equipped with air passage openings 12, which borders on the inside the frontal air channel 3b of the zone 3. The front wall 9 of the machine frame 7 projects further with a second wall area 9b provided with air passage openings 13 into the right half of the tower 2. This wall area 9b forms the frontal border wall of the right transport channel, as well as the channel wall equipped with air passage openings 13, which borders the frontal air channel 4b of the second zone 4 towards the inside. The laterally adjacent frontal air channels 3b, 4b of the two zones 3, 4 are bordered towards the outside, i.e. towards the front and the left and right sides of the tower 2 by the plates 8a, respectively doors 8b of the external lining 8. Between the front air channels 3b, 4b of the zones 3, 4 a vertical dividing wall 14 is arranged, which reaches forward from the front wall 9 of the machine frame 7 to the outer lining 8 or its doors 8b.

The rear wall 10 of the machine frame 7 projects with a first wall area 10a equipped with air passage openings 15 into the left half of the tower 2. This wall area boa forms the rear delimiting wall of the left transport channel and at the same time forms a channel wall equipped with air passage openings 15, which inwardly borders the rear air channel 3c of the first zone 3. Further the rear wall 10 of the machine frame 7 projects with a second wall area 10b equipped with air passage openings 16 into the right half of the tower 2. This wall area 10b forms the rear delimiting wall of the right transport channel and at the same time forms a channel wall equipped with air passage openings 16, which inwardly borders the rear air channel 4c of the second zone 4. The laterally adjacent rear air channels 3c, 4c of the two zones 3, 4 are bordered towards the outside, i.e. towards the rear and the left and right side of the tower 2 by plates 8a, respectively doors 8b of the outer lining 8. Between the rear air channels 3c, 4c of the two zones 3, 4, a vertical dividing wall 17 is arranged, which reaches rearward from the rear wall 10 of the machine frame 7 up to the outer lining 8, respectively its doors 8b.

At the charging station 5 the flat products 1 are introduced lying down into the transport compartments 18 of an endless transport device 19, which moves the products 1 upwards in a left transport channel through the first product track 3a, and moves them downwards in the right transport channel through the second product track 4a to the discharge station 6, where the products are delivered lying down. The transport compartments 18 are respectively delimited by a flat frame 20 preceding the transport compartment in the travel direction and a flat frame 20' trailing the transport compartment in travel direction. The flat frames 20 have horizontal crossbeams 20a in the neighborhood of the dividing wall 11. These are fastened with their front ends to an endless link chain 21 in the neighborhood of the front wall 9 of the machine frame 7 and with their rear ends in a link chain 22 in the neighborhood of the rear wall 10 of the machine frame 7. From the horizontal crossbeams 20a of the frames 20 project the holding brackets 20b respectively defining between them a common plane in the respective product tracks 3a, 4a. The endless transport device 19 further comprises an endless belt 23. Each belt 23 lies between two holding brackets 20b of the frames 20, respectively 20' on the outside of the crossbeam 20a, delimits the transport compartments 18 inwardly and revolves together with the same.

The two link chains 21 and 22 and the frames 20 fastened to their chain links run in the upper, respectively lower end segment 2a, respectively 2c of the tower over an upper, respectively lower guiding device 24, respectively 25, from one product track into the other. When passing the upper guiding device 24, the frames 20, 20' delimiting the transport compartments 18 at first fold slightly apart on their outside and then fold together again. Thereby the products 1, which in the first product track 3a lie respectively on the trailing frame 20 of a transport compartment 18 are transferred to the forerunning frame 20' of this transport compartment 18, where they lie then in the second product track 4a. When passing the upper guiding device 24, the respective product 1 touches with its margin facing the diving wall 11 the belts 23 forming the inner delimitation of the respective transport compartment 18. Due to this engagement the product 1 is entrained and transported with its downward facing margin by the trailing frame 20 to the forerunning frame 20' of the transport compartment.

From a middle segment 2b of the tower two rectangular housings 26, respectively 27 project outwardly left and right. In the left housing 26 a device not closer shown in the drawing for processing, respectively cooling the air is located. This air flows from the housing 26 into the frontal vertical air channel 3b of the first zone 3 and disperses vertically over the entire height of the same. From the frontal vertical air channel 3b the air flows from the side through its air passage openings 12 into the left transport channel and crosses the first vertical product track 31 transversely to the travel direction of the products. From the left transport channel the air flows through air passage openings 15 into the rear vertical air channel 3c of the first zone 3 and from there back again to the housing 26. In the right housing 27 a device not closer shown for the processing, respectively cooling of air is located. This air flows from the housing 27 into the rear vertical air channel 4c of the second zone 4 and disperses vertically therein over its entire height. From the rear air channel 4c the air flows from the side through its air passage openings 16 into the right transport channel and crosses the second vertical product track 4a transversely to the travel direction of the products. From the right transport channel the air flows through the air passage openings 13 into the frontal vertical air channel 4b of the second zone 4 and from there back again to the housing 27.

Figure 7:
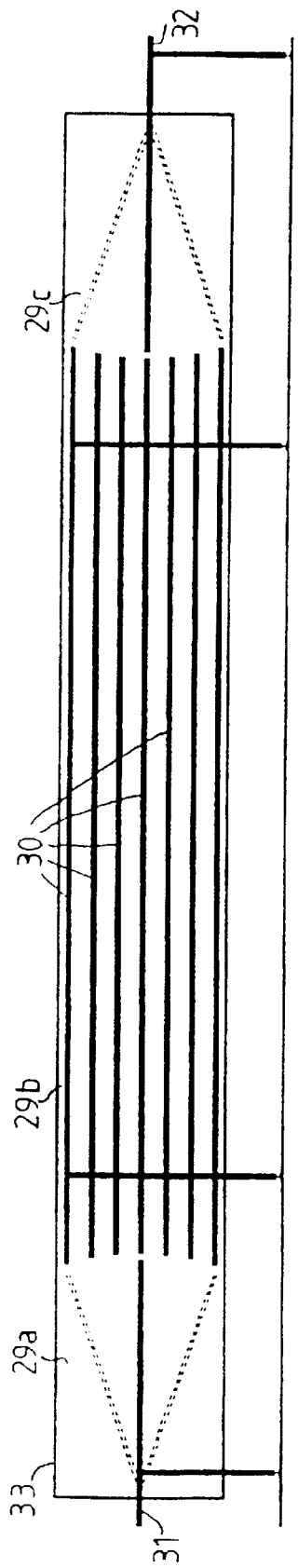
FIG. 7 is a vertical cross section through an elongated embodiment of a device for the treatment of starch-based products with air.
Figure 8:
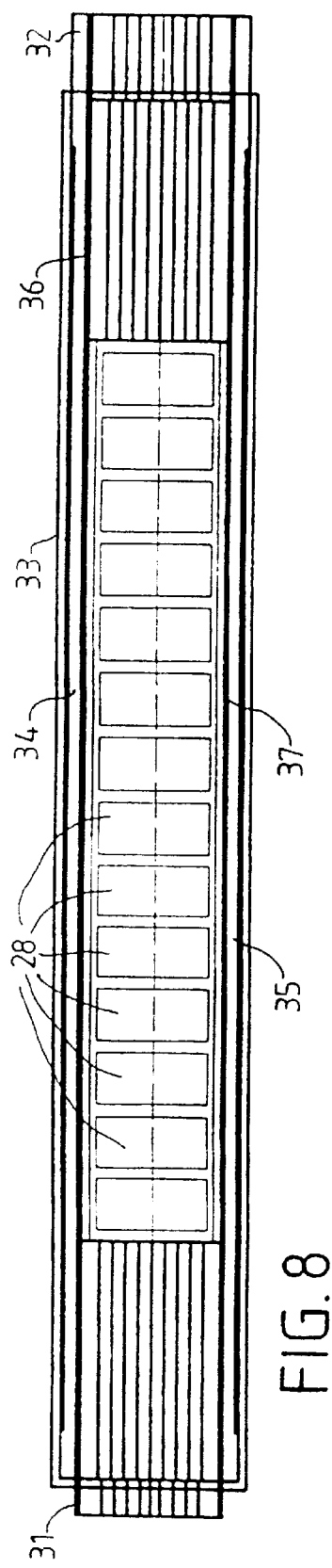
FIG. 8 is a horizontal longitudinal section through the device of FIG. 7.
Figure 9:
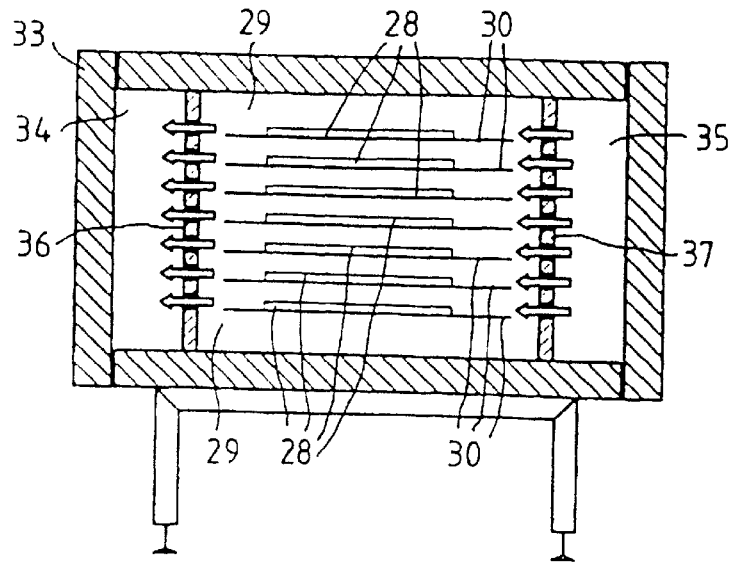
FIG. 9 is a vertical cross section through the device of FIG. 7.

FIGS. 7 to 9 show an embodiment of a horizontally stretched device for treating starch-based products with air. This device is intended for the cooling of even, flat products. These can be wafer blocks coated on the upper side with a cream layer or other flat products.

In this device the products 28 to be cooled are cooled in a horizontal transport channel 29 in several product tracks 30 arranged on top of each other. The products 28 are introduced in a supply plane 31 into the transport channel 29 and, in its initial segment 29a, transferred to the superimposed product tracks 30 of the middle segment 29b of the transport channel 29. In the end segment 29c of the transport channel 29 they are delivered to a single discharge station 32, which takes the products 28 out of the transport channel 29. The supply plane 31 and the transport plane of the discharge device 32 lie in the same horizontal plane.

The transport channel 29 is arranged in a long-stretched, rectangular housing 33 between two horizontal air channels 34 and 35 in a zone which is connected via incoming air lines and outgoing air lines to a cooling aggregate not shown in the drawing and wherein the cooled air from an air channel 35 flows transversely to the travel direction of products 28 through the transport channel 29 and its superimposed product tracks 30 into the other air channel 34. Between the transport channel 29 and the two air channels 34, 35, vertical dividing walls 36, respectively 37 running parallel to the travel direction of the products 38 are provided, which are equipped with air passage openings. These dividing walls 36, 37 are formed by the bearing walls of the machine frame supporting the housing 33. The two dividing walls 36, 37 are interconnected by the separate crossbeams of the machine frame arranged at a distance from each other, transversely to the travel direction of the products 28.

The housing 33 consists of heat-insulating plates detachably mounted on the machine frame and of heat-insulating doors swingably supported on these plates, respectively on the machine frame. The plates and doors form an external heat-insulating lining, which borders the upwards and downwards open transport channel 29 at the top and at the bottom. Each air channel 34, 35 is delimited towards the inside by dividing walls 36, 37 provided with air passage openings. The upper covering wall, the lower bottom wall and the rear wall facing away from the transport channel 29 of each air channel 34, 35 are formed by the outer lining.

Figure 10:
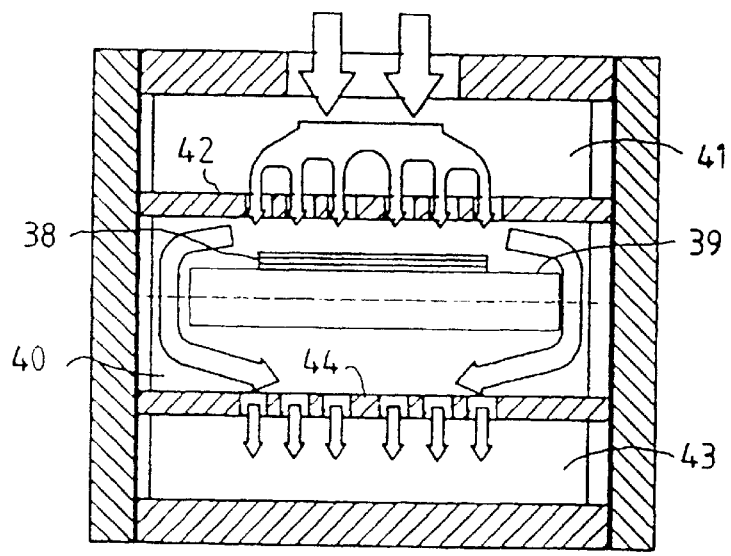
FIG. 10 is a vertical cross section through a further elongated embodiment of a device for treating starch-based products with air.

FIG. 10 shows a cross section through a horizontal long-stretched device for treating starch-based products with air. This device is designed as a cooling device wherein products 38 are transported through a single horizontal product track 39 through a transport channel 40, for instance by a transport belt or a screen belt. In this embodiment above the transport channel 40 a horizontal air channel 41 is arranged, which is separated from the transport channel 40 by its bottom 42 equipped with air passage openings. Underneath the transport channel 40 a further air channel 43 is arranged, which is separated from the transport channel 40 by its cover 44 equipped with air passage openings. The bottom 42 of the upper air channel 41 and the cover 44 of the lower air channel 43 are designed as horizontal bearing walls of the machine frame, which are interconnected by vertical members of the machine frame. In this embodiment the outer lining supported by the machine frame forms the lateral walls of the transport channel 40 and of the two air channels 41 and 43, as well as the cover of the upper air channel 41 and the bottom of the lower air channel 43.

Figure 11:
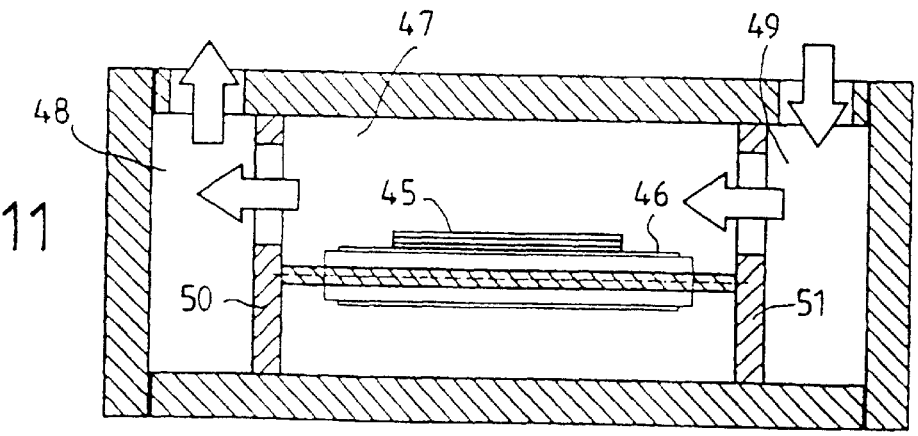
FIG. 11 is a vertical cross section through a further elongated embodiment of a device for treating starch-based products with air.

FIG. 11 shows a cross section through a horizontal long-stretched device for treating starch-based products with air. This device is designed as a cooling device, wherein the products 45 are transported in a single horizontal product track 46 through a horizontal transport channel 47 arranged between two lateral air channels 48, 49 of a zone, by means of a transport belt or screen belt. The two lateral air channels 48, 49 are bordered inwardly towards the transport channel 47 by the bearing walls 50, 51 of the machine frame, which are interconnected by horizontal crossbeams of the machine frame, each being equipped with air passage openings. Upwards, downwards and outward the two lateral air channels 48, 49 are bordered by the outer lining supported by the machine frame, which also outwardly borders the transport channel 47 on its upper side and on its lower side.

FIGS. 7 to 11 show embodiment examples of a long-stretched device for treating products with cooled air for cooling products. In order to switch these embodiment examples to the treatment of products with air for setting a certain humidity content, it is only required to externally connect the air channels to an air treatment device, which heats, humidifies and filters the air to be circulated in the air channels.

What is claimed is:

1. A device for treating starch-based products in the form of edible wafer products and biodegradable packaging products, with air for setting a certain humidity content of the products or for cooling the products, the device comprising:

a machine frame;

an outer lining on said machine frame containing at least one transport device for transporting the products in at least one transport channel outwardly bordered by the outer lining from a charging station to a discharge station in at least one product track through at least one zone, said zone having at least two air channels running at least partially parallel to a respective product track, each air channel having a channel wall facing the product track and equipped with air passage openings, whereby in said zone air flows from one air channel through the respective product track, transversely to the transport direction of the products and into the other air channel, each of said air channels being bordered on the outside by the outer lining; and a channel wall bordering an inside of each air channel, equipped with said air passage openings and formed by a respective bearing wall of the machine frame, at least two of said bearing walls of the machine frame receiving between them said transport channel containing said product track.

2. The device according to claim 1 wherein each bearing wall of the machine frame forms a wall area of a channel wall of an air channel provided with air passage openings, and is a smooth wall at least on a side of said wall area facing the respective air channel.

3. The device according to claim 2 wherein each of said wall areas is a smooth wall a side facing away from the respective air channel.

4. The device according to claim 1 wherein substantially horizontal transport channel containing at least one product track is arranged between two bearing walls of the machine frame which form the channel walls equipped with air passage openings of at least two air channels.

5. The device according to claim 4 wherein the horizontal transport channel has two superimposed product tracks separated by a horizontal dividing wall which interconnects the two bearing walls of the machine frame forming the channel walls equipped with air passage openings of said air channels.

6. The device according to claim 4 wherein the transport channel contains product tracks arranged one above the other, a respective transport device being provided for each product track.

7. The device according to claim 4 wherein at least. one endless transport device extends through two superimposed product tracks in said transport channel.

8. The device according to claim 1 wherein an elongated, substantially vertical transport channel is provided and contains said product track is arranged between two of said bearing walls of the machine frame.

9. The device according to claim 8 wherein the vertical transport channel has, between two neighboring product tracks, a vertical dividing wall which connects the two bearing walls.

10. The device according to claim 8 wherein at least one endless transport device for the products is provided in the vertical transport channel and said endless transport device extends through two neighboring product tracks with transport compartments open towards the outside lining, which on their inner sides are delimited at least by one endless belt of the transport device.

11. The device according to claim 2 wherein the bearing walls are massive plates.

12. The device according to claim 11 wherein the massive plates are aluminum plates.

13. The device according to claim 2 wherein at least in an area where it outwardly borders the air channels, the outer lining has doors swingably supported on the machine frame, which in a closed position outwardly delimit the respective air channel with smooth inner sides of the doors.

* * * * *